J. F. GROSS.

VEHICLE SPRING.

No. 10,836. Reissued May 24, 1887.

Witnesses:
Jas. E. Hutchinson.
Geo. F. Downing.

Inventor:
John F. Gross
By W. K. Miller
Attorney

N. PETERS, Photo-Lithographer, Washington, D. C.

UNITED STATES PATENT OFFICE.

JOHN F. GROSS, OF CANTON, OHIO.

VEHICLE-SPRING.

SPECIFICATION forming part of Reissued Letters Patent No. 10,836, dated May 24, 1887.

Original No. 352,918, dated November 23, 1886. Application for reissue filed January 31, 1887. Serial No. 226,044.

*To all whom it may concern:*

Be it known that I, JOHN F. GROSS, a citizen of the United States, and a resident of Canton, in the county of Stark and State of Ohio, have invented certain new and useful Improvements in Vehicle-Springs; and I do hereby declare that the following is a full, clear, and exact description of the same, reference being had to the annexed drawings, making a part of this specification, and to the letters and figures marked thereon, in which—

Figure 1:
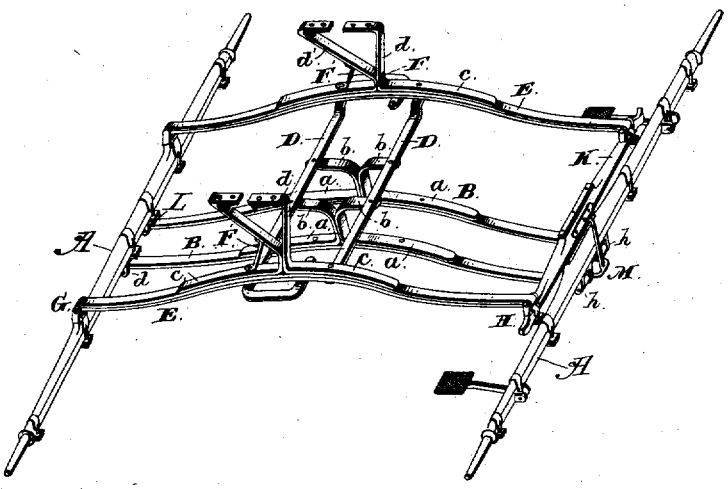
Figure 2:
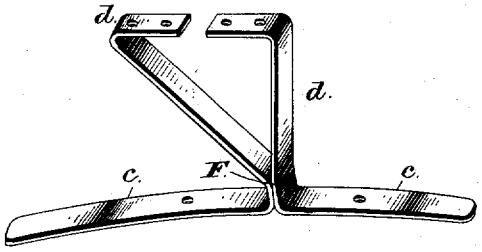
Figure 3:
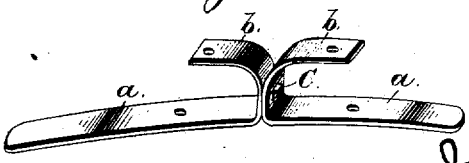

Figure 1 is a perspective view of the running-gear, showing spring attached thereto. Fig. 2 is a detached view of seat-spring. Fig. 3 is a detached view of the top leaves of main spring.

The present invention has relation to vehicle-springs; and its nature consists in the different parts and combination of parts hereinafter described, and set forth in the claims.

Similar letters of reference indicate corresponding parts in all the figures of the drawings.

In the accompanying drawings, A A represent the axles of a vehicle, which are constructed in the ordinary manner, and to which the different parts belonging thereto may be attached in any well-known and approved manner.

The rear ends of springs E E are connected to shackles G, mounted on the rear axle, A. The front ends of said springs are connected to shackles H, mounted on bolster K, and may be substantially of the form shown in the accompanying drawings. In the drawings said springs are shown formed of a single piece; but, if desired, additional leaves may be provided for the purpose of strengthening said springs. To the top or upper side of said springs E E are connected, by any of the well-known and approved forms or plans of connecting such parts, the auxiliary springs *c c*, said auxiliary springs being provided with the bent or curved portions *d d*, said bent or curved portions being so formed that a vehicle seat can be attached thereto.

The rear ends of springs B B are connected to shackles L, mounted on rear axle A, the front end having a shackle or other suitable connection with the fifth-wheel M. In the present case lugs *h h* are projected from the fifth-wheel M, as shown in Fig. 1, and the springs supported on a bolt.

To the top or upper sides of the springs B B are connected the auxiliary springs *a a*, said springs being provided with the bent or curved portions *b b*, and may be substantially of the form shown in the drawings. To the upper end of the bent or curved portions *b b* are connected the cross-bars D, substantially as shown in the drawings, the ends of said cross-bars D being attached to the springs E E.

It will be seen that by my arrangement and adjustment all of the springs will act in unison, and the axles A A will spread apart or come together as the springs vibrate.

Having now fully described my invention, what I claim as new, and desire to secure by Letters Patent, is—

1. The springs B B, provided with auxiliary springs *a a* and the bent or curved portions *b b*, substantially as and for the purpose specified.

2. The springs E E, provided with auxiliary springs *c c* and the bent or curved portions *d d*, substantially as and for the purpose specified.

3. The combination of the parallel springs B B and E E, provided with auxiliary springs *a a* and *c c*, having the bent or curved portions *b b* and *d d*, substantially as and for the purpose specified.

In testimony whereof I have hereunto set my hand this 31st day of December, A. D. 1886.

JOHN F. GROSS.

Witnesses:
CHAS. R. MILLER,
W. K. MILLER.